Patented Dec. 16, 1924.

1,519,322

UNITED STATES PATENT OFFICE.

IZADOR J. NOVAK, OF BRIDGEPORT, CONNECTICUT, ASSIGNOR TO THE RAYBESTOS COMPANY, OF BRIDGEPORT, CONNECTICUT, A CORPORATION OF CONNECTICUT.

PROCESS OF MAKING FRICTION ELEMENTS.

No Drawing.   Application filed October 21, 1922.   Serial No. 596,152.

*To all whom it may concern:*

Be it known that I, IZADOR J. NOVAK, a citizen of the United States, and a resident of the city of Bridgeport, county of Fairfield, and State of Connecticut, have invented certain new and useful Improvements in Processes of Making Friction Elements, of which the following is a specification.

This invention relates to improvements in process for making friction elements such as flexible woven brake lining, or clutch facings, and refers more particularly to a brake lining fabric in which a relatively cheap solvent for the saturant is used in place of the solvents now common to the art.

Among the objects of the invention are to provide a process in which the saturant substances are dissolved in a solvent after which the brake lining material is immersed and saturated; to provide a process in which the solvent is removed leaving the saturant impregnated in the brake lining material, and in as dispersed and uniform condition as though the saturant were impregnated with the usual type of solvent such as alcohol, benzol, toluol, gasoline or naphtha.

In using a hydrocarbon solvent, the following compositions may be used in the saturant:

14 parts rosin,
6 parts phenol resin,
80 parts alcohol.

These ingredients may be varied somewhat according to the type of brake lining or clutch facing desired. In using this solvent, woven asbestos tape for example, may be rolled to the desired finished size before saturation, and passed through a tank containing the solvent at normal room temperature, allowing sufficient time for immersion to thoroughly impregnate and saturate the material. The surface saturant may be then removed from the woven brake lining surface by scraping.

With this treatment, approximately 40% of saturant on the original weight has been added. The saturated lining is then placed in an oven, heated to say 200° F., more or less, where the solvent alcohol is dried out, leaving a residual saturant consisting of about 8% of a mixture of rosin and phenol resin in amounts in relation of about 7 parts of rosin to 3 of phenol resin. The dry lining is then rolled to size in calender rolls, and it ready for use.

The above method is simple and effective, but is more or less expensive due to the cost of the alcohol. However, in some cases, water may be used as a solvent, but in such event, the phenol resin and the rosin should be put into a state in which they are soluble in water. By forming the substances into their related sodium compounds by a process analogous to that in which vegetable oils are converted into soap, they become soluble in water. In other words, rosin and phenol resin soaps are first formed and are then dissolved in water. If they are introduced in this form into the lining by saturation and drying, with no further processing, these soaps will remain soluble in water, which is an objectionable feature as the brake lining must be resistant to moist condition.

In order to change the characteristics of the soaps so that they are moisture resistant after saturation, dilute acid may be used as a fixing agent which makes the saturant insoluble in water.

One method of making brake linings with my process is as follows:

I take phenol resin, which may be made by any process, such as the bakelite or furfural processes and saponify it with caustic soda in the usual way. I then take rosin and saponify it in a manner well known. I then make a saturant composed of about six parts rosin to four parts of the phenol resin by weight, although it is understood that these proportions can be varied. These are mixed while heated to say, 150° F., to prevent the sodium resinate from precipitating out. I then take this mixture and while still hot, immerse asbestos tape, which may be, for example, asbestos covered wire, until the tape is completely saturated. To make this saturation, I thin the saturant with water to about 15% strength. By regulating the strength of this thinned solution, I can regulate the amount of the residual binder relative to the tape. I have found that about ten parts of residual binder by weight to one hundred parts of tape by weight makes a satisfactory lining.

After the tape is saturated, the excess saturant is scraped from the surface thereof, by running it through a weighted scraper. I then place the saturated tape in an acid solution of about 10% sulphuric acid, which may be either hot or cold, in order to reprecipitate the rosin and phenol resin from the saponified solution. I then put the tape in a dryer and heat it to 200 to 250° F., in order to evaporate the water. The tape may then be calipered through suitable calender rolls and the roll of tape is then ready for use.

By having a saturant which can be thinned by water, as above described, it is possible to very readily regulate the amount of binder to tape, which in some of the prior processes, has been somewhat difficult. Also, this obviates the necessity of using inflammable and more expensive substances. The finished tape has a very uniform minimum coefficient of friction.

In brake linings, as the lining wears in use, there is usually a tendency to form a glaze on the wearing surface of the lining, thus lowering the coefficient of friction. It is of course, desirable that the minimum coefficient of friction does not drop below a point at which the brake will not satisfactorily hold. After this glazed surface has worn away, there is a tendency for the coefficient of friction to rise. The period in which the brake lining has the minimum coefficient of friction varies and the period of time before the glaze is worn off, differs greatly. Brake linings made of this process have a minimum coefficient of friction higher than that of any brake lining now in use, of which I am aware.

Due to the relatively small percentage of binder, this condition of minimum coefficient of friction, due to the glazing of the wearing surface, does not last very long, because there is a minimum of glaze to wear away.

The product of this process forms the subject matter of a co-pending application, Serial No. 596,155 filed October 21st, 1922.

I claim as my invention:

1. A process for making friction elements consisting in impregnating friction material with a potential binder of saponified phenolic condensation product and gum carried in a water vehicle, adding a fixing material and subsequently removing the water by drying below 250° F., at atmospheric pressure.

2. A process for making friction elements consisting in saturating friction material with a potential binder consisting of sodium rosinate and sodium phenol resinate contained in a liquid vehicle, adding a fixed agent, and then drying out the vehicle.

3. A process for making friction elements consisting in saturating friction material with a binder containing sodium rosinate and sodium phenol resinate contained in a liquid vehicle, and adding a fixing agent.

4. A process of making brake linings, consisting in immersing previously prepared woven asbestos friction elements in a saturant composed of predetermined proportions of saponified phenol resin and rosin, said saturant being thinned to a desired consistency by the addition of an aqueous fluid, the amount of binder to friction material in the finished product being regulated by the amount of aqueous fluid added to the saturant and adding a fixing agent.

5. A process of making brake linings, consisting in preparing a mixture of saponified phenol resin and rosin, at a temperature below the boiling point of water, regulating the consistency of such mixture by the addition of an aqueous fluid, immersing asbestos friction material in said mixture, and saturating said material, scraping off the excess saturant, subjecting the saturated material to an acid solution, then subjecting it to heat and calendering to produce a friction material of desired configuration and containing predetermined quantities of binder.

6. A process of making brake linings, consisting in preparing a mixture of saponified phenol resin and rosin, regulating the consistency of such mixture by the addition of an aqueous fluid thereto, immersing an asbestos base in said mixture to saturate same, adding a fixing agent, evaporating the aqueous fluid from the saturated material by means of heat, and forming the finished material into any desired size and shape.

7. A process of making brake linings, consisting in preparing a mixture of saponified phenol resin and rosin, at a temperature below the boiling point of water, regulating the consistency of such mixture by the addition of an aqueous fluid, immersing an asbestos base in said mixture to saturate said base, scraping off the excess saturant, subjecting the saturated base to an acid solution, then drying the saturated base and sizing to produce a friction material of desired configuration and containing predetermined quantities of binder.

8. A process of making brake linings, consisting in preparing a mixture of saponified phenol resin and rosin, regulating the consistency of such mixture by the addition of an aqueous fluid thereto, immersing an asbestos base in said mixture to saturate same, adding a fixing agent, evaporating the aqueous fluid from the saturated material and forming the finished material into any desired size and shape.

IZADOR J. NOVAK.